United States Patent
Bakhoum

(10) Patent No.: US 9,312,076 B1
(45) Date of Patent: Apr. 12, 2016

(54) VERY HIGH ENERGY-DENSITY ULTRACAPACITOR APPARATUS AND METHOD

(75) Inventor: Ezzat G. Bakhoum, Pace, FL (US)

(73) Assignee: University of West Florida, Rensacola, FL (US)

( * ) Notice: Subject to any disclaimer, the term of this patent is extended or adjusted under 35 U.S.C. 154(b) by 89 days.

(21) Appl. No.: 12/655,426

(22) Filed: Dec. 30, 2009

(51) Int. Cl.
| H01G 9/00 | (2006.01) |
| H01G 9/04 | (2006.01) |
| H01G 9/145 | (2006.01) |
| H01G 9/15 | (2006.01) |

(52) U.S. Cl.
CPC .............. *H01G 9/15* (2013.01); *H01G 9/155* (2013.01); *Y02E 60/13* (2013.01)

(58) Field of Classification Search
CPC .............................. H01G 9/155; Y02E 60/13
USPC .......................... 361/502, 508, 516
See application file for complete search history.

(56) References Cited

U.S. PATENT DOCUMENTS

| 3,288,641 | A | 11/1966 | Rightmire |
| 6,059,847 | A | 5/2000 | Farahmandi et al. |
| 6,277,515 | B1* | 8/2001 | Akahira ............ 429/152 |
| 2002/0080558 | A1* | 6/2002 | Nonaka et al. ............ 361/502 |
| 2007/0053139 | A1* | 3/2007 | Zhang et al. ............ 361/311 |
| 2007/0070581 | A1* | 3/2007 | Yoshida et al. ............ 361/502 |
| 2007/0082261 | A1* | 4/2007 | Lee ............ 429/144 |
| 2007/0258192 | A1 | 11/2007 | Schindall et al. |
| 2008/0138700 | A1* | 6/2008 | Horpel et al. ............ 429/129 |
| 2008/0206632 | A1* | 8/2008 | Wang et al. ............ 429/163 |
| 2008/0316678 | A1 | 12/2008 | Ehrenberg et al. |
| 2009/0154060 | A1* | 6/2009 | Anderson et al. ............ 361/502 |
| 2009/0233789 | A1 | 9/2009 | Gadkaree et al. |
| 2011/0149473 | A1* | 6/2011 | Eilertsen et al. ............ 361/502 |

OTHER PUBLICATIONS

Timoty J. Boyle, Louis J. Tribby, Timothy N. Lambert, Sang M. Han, Charles D.E. Lakeman, Patrick F. Fleigh, "Metal Oxide Coating of Carbon Supports for Supercapacitor Applications", Jul. 2008, Sandia National Laboratories.*

\* cited by examiner

*Primary Examiner* — Jayprakash N Gandhi
*Assistant Examiner* — Arun Ramaswamy
(74) *Attorney, Agent, or Firm* — J. Nevin Shaffer, Jr.

(57) ABSTRACT

A very high energy-density ultracapacitor apparatus and method includes more than one carbon electrode with an outer surface and an inner surface. A conductive metallic surface is connected with the outer surface. A ceramic is connected with the inner surface of at least one of the more than one carbon electrodes. A separator is provided between the more than one carbon electrode and an electrolyte is provided.

22 Claims, 2 Drawing Sheets

VERY HIGH ENERGY-DENSITY ULTRACAPACITOR APPARATUS AND METHOD

FIELD OF THE INVENTION

This invention relates to an ultracapacitor apparatus and method. In particular, in accordance with one embodiment, the invention relates, to a very high energy-density ultracapacitor including more than one carbon electrode with an outer surface and an inner surface. A conductive metallic surface is connected with the outer surface. A ceramic is connected with the inner surface of at least one of the more than one carbon electrodes. A separator is provided between the more than one carbon electrode and an electrolyte is provided.

BACKGROUND OF THE INVENTION

Ultracapacitors are widely used commercially at the present; the main application being energy storage for hybrid electric vehicles. Other applications, such as energy balancing in smart electrical grids, on-site energy storage for wind and solar energy projects, etc., are expected to materialize in the near future. The ultracapacitor was first described by Rightmire in 1966, in U.S. Pat. No. 3,288,641. For the past four decades, the basic structure of the ultracapacitor has hardly changed.

Fundamentally, an ultracapacitor consists of two metal plates separated by an insulator, just like an ordinary capacitor. The separator, however, is porous and is soaked in an electrolyte. Since ions that form in the electrolyte can move freely through the separator, positive and negative ions move in opposite directions and cling to their respective electrodes. The important feature in the ultracapacitor of the present invention is that the inner surface of each electrode is not a smooth surface but is rather padded with activated (porous) carbon. As with all terms used herein, the term "porous" is used with its common meaning of possessing or full of pores. This results in a surface area that is about 100,000 times as large as the surface area of an ordinary capacitor. The immense surface area of an ultracapacitor, however, is not the only important feature of the device. Since charges are carried by ions that cling to the inner surfaces of the electrodes, the practical distance between the positive and the negative charges at each electrode is on the order of a few nanometers (the size of a few molecules). As is well known, the capacitance of a parallel-plate capacitor is given by $$C = \frac{\epsilon_0 \epsilon_r A}{d}$$

where $\epsilon_0$ is the permittivity of free space, is the relative permittivity (or dielectric constant) of the dielectric present between the electrodes. A is the electrode area and d is the distance between the positive and the negative concentrations of charges. By maximizing A and minimizing d, therefore, ultracapacitors achieve extremely high values of capacitance. While the basic structure of the ultracapacitor has hardly changed since its introduction in 1966, some efforts and attempts to improve its performance include:

1. U.S. Pat. No. 6,059,847 by Farahmandi et al., which discloses a way for packaging the Rightmire ultracapacitor;
2. U.S. patent application Ser. No. 11/429,565 by Schindall et al., which discloses the concept of replacing the activated carbon by carbon nano-tubes, for the purpose of increasing the surface area A of the electrode. The general idea of such an approach, however, is not novel and has been shown in numerous earlier publications;
3. U.S. patent application Ser. No. 11/879,482 by Ehrenberg et al, which discloses a 3-layer capacitor structure. Two of the layers contain a polarizable polymer, and the third layer contains Barium Titanate. All three layers behave as independent capacitors and store energy in the polarizable medium. It is not obvious that such a structure will offer any advantages by comparison with the traditional ultracapacitor.
4. U.S. patent application Ser. No. 11/980,883 by Gadkaree et al., which discloses a modern chemical process for manufacturing the activated carbon in the Rightmire ultracapacitor.

With the ever increasing worldwide demand for energy, and the looming crises in petroleum supplies, energy storage, particularly for transportation applications, is emerging as an important area of research. As a result, the relatively new component known as an ultracapacitor or "super capacitor" has gained much attention recently. By comparison with batteries, ultracapacitors offer the advantages of very short charge/discharge time, virtually unlimited cycle life, zero maintenance requirements, and operability over a very wide range of temperatures. Ultracapacitors, however, still lag behind batteries in the aspect of energy density. The energy storage capability of commercially available ultracapacitors is about an order of magnitude lower than Lithium-ion batteries of the same dimensions, for example.

Thus, what is needed is an ultracapacitor that has a high energy density and that stores more energy than batteries, fuel cells and other technologies such that the ultracapacitor essentially equals the performance of gasoline. It, therefore, is an object of the invention to provide a very high density-energy ultracapacitor that greatly increases the energy density of an ultracapacitor, that is economical to build and efficient.

SUMMARY OF THE INVENTION

Accordingly, the ultracapacitor apparatus of the present invention, according to one embodiment includes more than one carbon electrode with an outer surface and an inner surface. A conductive metallic surface is connected with the outer surface. A ceramic is connected with the inner surface of at least one of the more than one carbon electrode. A separator is located between the more than one carbon electrode and an electrolyte is provided.

As used herein, the terms "ultracapacitor", "electrode" and "electrolyte" are given their common meaning.

According to another aspect, the invention includes a housing conformed to contain the more than one carbon electrode and the separator and the electrolyte. In another aspect, a terminal is connected with the more than one carbon electrode. In one aspect, the apparatus is rolled and formed into a cylindrical shape. In a further aspect, the ceramic is a high dielectric-constant ceramic. In another aspect, the separator is a non-conductive porous separator.

According to another embodiment of the invention, a very high energy-density ultracapacitor apparatus includes a first carbon electrode with an outer surface and an inner surface and a second carbon electrode with an outer surface and an inner surface. A conductive metallic surface is connected with the outer surface. A high dielectric-constant ceramic is connected with the inner surface. A non-conductive porous separator is positioned between the first carbon electrode and the second carbon electrode and an electrolyte is provided.

In another aspect, a housing, conformed to contain the first carbon electrode and the second carbon electrode and the separator and the electrolyte is provided. In a further aspect, a terminal is connected with the first carbon electrode and a terminal is connected with the second carbon electrode. In another aspect, the apparatus is rolled and formed into a cylindrical shape.

In one aspect, the carbon electrodes are made from material selected from a group of materials consisting of: activated carbon, carbon nano tubes, graphite, and charcoal. In another aspect, the electrolyte is selected from a group of electrolytes consisting of Propylene Carbonate, Acetonitrile, an ionic salt, an ionic fluid, 1-butyl-3-methylimidazolium tetrafluoroborate, and tetraethylammonium-tetrafluoroborate. In a further aspect, the high dielectric-constant ceramic is selected from a group of ceramics consisting of: Barium Titanate and Barium Strontium Titanate. In one aspect, the conductive metallic surface is an aluminum sheet. In another aspect, the non-conductive porous separator is high porosity paper.

According to another embodiment, a very high energy-density ultracapacitor method consists of the following steps: providing a first carbon electrode with an outer surface and an inner surface and a second carbon electrode with an outer surface and an inner surface, with a conductive metallic surface connected with the outer surface, with a high dielectric-constant ceramic connected with the inner surface, with a non-conductive porous separator located between the first carbon electrode and the second carbon electrode, with an electrolyte and with a terminal connected with the first carbon electrode and a terminal connected with the second carbon electrode; and then connecting the terminals to an electrical system.

In another aspect, a housing, conformed to contain the first carbon electrode and the second carbon electrode and the separator and the electrolyte, is provided. In a further aspect, the housing is made of material selected from a group of materials consisting of: plastic and metal. In one aspect, the capacitor is rolled and formed into a cylindrical shape. In a further aspect, the ceramic is connected with the electrodes by means of a process selected from a group of processes consisting of: electrophoretic deposition, chemical vapor deposition and pulsed laser deposition.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
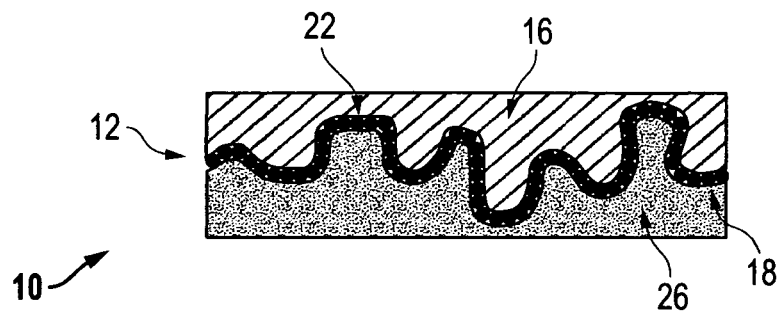
FIG. 1 is a side cross sectional view of the ultracapacitor of the present invention according to one embodiment showing a single electrode.

The preferred embodiment of the present invention is illustrated by way of example in FIGS. 1-4. With specific reference to FIGS. 1 and 2, an ultracapacitor apparatus 10 according to a preferred embodiment includes a first electrode 12 and a second electrode 14. FIG. 1 only shows a single electrode, electrode 12. Preferably, electrodes 12 and 14 are made of activated carbon, or carbon nano tubes, or graphite or charcoal, as desired. Any form of activated carbon now known or hereafter developed is suitable.

Figure 2:
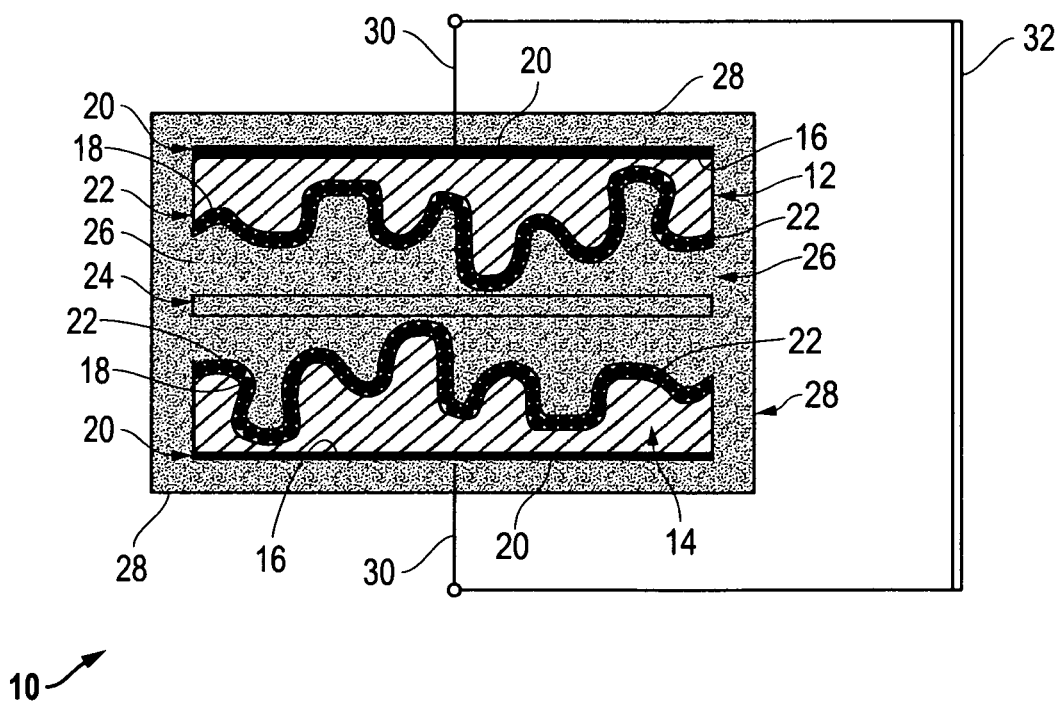
FIG. 2 is a side cross sectional view of the ultracapacitor of the present invention showing two electrodes, a conductive metal plate, a separator, electrolyte, a housing and terminals.

First electrode 12 and second electrode 14 have an outer surface 16 and an inner surface 18. Conductive metallic surface 20 is connected with the outer surface 16 of each electrode as shown in FIG. 2. Preferably, conductive metallic surface 20 is aluminum sheet but any conductive metallic surface providing the desired results is suitable for purposes of the invention.

Ceramic 22 is connected with the inner surface 18 of either one or both electrodes as shown in FIGS. 1 and 2. As shown in FIGS. 1 and 2, inner surface 18 is porous or full of pores which according to the invention are coated with ceramic 22 as illustrated. Preferably, ceramic 22 is a high dielectric-constant ceramic such as Barium Titanate and/or Barium Strontium Titanate and any high dielectric-constant ceramic with an $\epsilon_r=10,000$ or higher is suitable. Applicant has also determined that it is preferable for the grain size of the ceramic material to be approximately 50-100 nm.

The preferred method for the deposition of the ceramic 22 in the pores of the inner surface 18 of the activated carbon or carbon nano-tube electrode 12 and/or 14 is the electrophoretic deposition method. However, other methods, such as chemical vapor deposition or pulsed laser deposition, can also be used.

As shown in FIG. 2, a separator 24 is provided. Separator 24 is preferably a non-conductive porous separator such as porous paper. Electrolyte 26 surrounds first electrode 12, second electrode 14, separator 24 and conductive metallic surface 20 as shown.

The electrolytes that are typically used in ultracapacitors comprise highly polar liquids such as Acetonitrile or Propylene Carbonate, which may include a dissolved ionic salt such as TEA-BF4 (tetraethylammonium-tetrafluoroborate). Applicant has determined that other electrolytes, such as an ionic salt, an ionic fluid, and 1-butyl-3-methylimidazolium tetrafluoroborate are suitable for the present invention as well.

Still referring to FIG. 2, in a preferred embodiment, housing 28 surrounds electrodes 12 and 14, metallic surfaces 20 and separator 24 and holds electrolyte 26 on the inside of the housing 28 as shown. Housing 28 may be made of any suitable material such as plastic and metal.

FIG. 2 also illustrates terminal 30 connected through housing 28 with metallic surface 20 and, thus, with first electrode 12 and second electrode 14. By use of terminals 30, ultracapacitor 10 may be connected with any electrical system 32, such as found in a vehicle or electronic device of any type.

Figure 3:
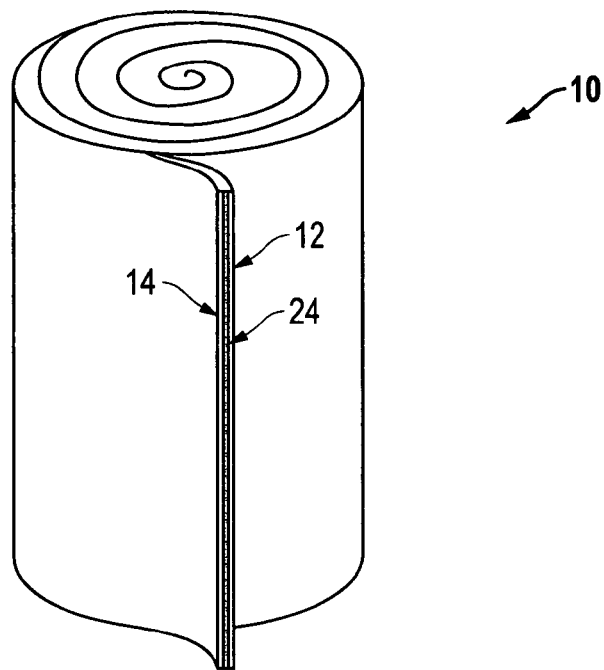
FIG. 3 is a perspective view of the ultracapacitor of the present invention rolled and formed into a cylinder shape.

Referring now to FIG. 3, according to one embodiment of the invention, first electrode 12 and second electrode 14, as described above, including all the elements described above as well as the separator 24 are rolled into a cylindrical form as shown. This is a preferred, space-saving method for the assembly of such capacitors. Note that the external housing 28 and terminals 30, for example, are not shown in FIG. 3 and it is the space saving form that is primarily illustrated.

In a conventional ultracapacitor, the charges in the electrolyte 26, which acts as an electrode, come to within a distance of about 1 nm from the inner surface 18 of the activated carbon electrode 12 and 14. While the distance d between the positive and negative charges is minimized, the overall permittivity is only approximately that of free space ($\epsilon_o$). Again, according to the preferred embodiment of the present invention a layer of a high dielectric-constant ceramic 22 is inserted as an interface between the electrolyte 26 and the inner surface 18 of the activated carbon electrode 12 and 14. Again, the preferred ceramic is BaSrTiO$_3$ ($\in_r$ of about 10,000 or higher), with a grain size of 50-100 nm. Applicant has determined that while the insertion of such a ceramic layer reduces the capacitance per unit area 50-100 fold (due to the increased distance d), a tremendous, unexpected gain in the overall permittivity of 10,000 or more is obtained. The result, therefore, is a dramatic increase of about 100-200 fold in the capacitance per unit area of Applicant's ultracapacitor over that of any prior art ultracapacitor.

Figure 4:
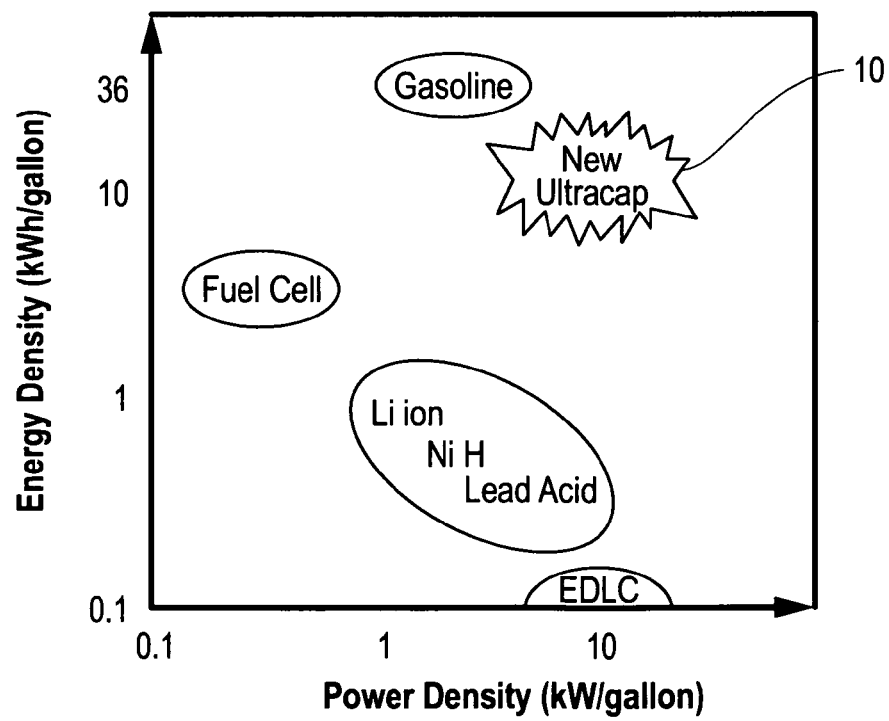
FIG. 4 is a chart of energy density versus power density for various current technologies and the ultracapacitor of the present invention.

Referring now to FIG. 4, a plot illustrates the energy density versus the power density for a number of known technologies, including batteries (Li-ion, Ni—H, and Lead-acid), the electrolytic double-layer ultracapacitor (ELDC, the current ultracapacitor technology), fuel cells, gasoline and the present invention, the "new ultracap". As FIG. 4 shows, the Applicant's ultracapacitor apparatus 10 comes closest to matching the performance of gasoline. It is to be noted that the burning of gasoline is only thirty percent efficient in reality and that the energy density of the present ultracapacitor invention shown in the figure is a very conservative number.

Thus, Applicant's very high energy-density ultracapacitor apparatus 10 clearly is a serious contender for the replacement of fossil fuels in transportation applications and conventional batteries. Such a substantial energy storage capability can also be very useful for power balancing in smart electrical grids; can be used to provide on-site energy storage for wind and solar applications; can spur the development of a new family of energy-efficient electrical machines and appliances. In addition, the substantial energy and power densities enabled by the present invention comes with the other significant advantages of ultracapacitors such as the virtually unlimited cycle life, zero maintenance requirements, and operability over a wide range of temperatures. Certainly, other applications that can benefit from the present invention include military applications and small scale energy storage applications. For example, the ability to recharge cellular phones and laptop computers in seconds instead of hours can potentially revolutionize these industries.

Further, Applicant's invention is extraordinarily cost effective. The cost of Lithium-ion batteries, for example, is $625 per kWh, according to published figures, and Applicant has determined that the cost to produce the present invention to be significantly less than that and at least half that. In addition, the present invention will be about one-tenth the size of a Lithium-ion battery of the same capacity. Clearly, the present invention is very cost effective by comparison with existing technologies.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An ultracapacitor apparatus comprising:
   a. more than one carbon electrode with an outer surface and a porous inner surface with pores;
   b. a conductive metallic surface connected with said outer surface;
   c. a ceramic having a dielectric constant of 10,0000 or higher directly coating the pores of said porous inner surface of at least one of said more than one carbon electrode;
   d. a separator between said more than one carbon electrode said separator not containing the ceramic coating; and
   e. an electrolyte comprising an ionic salt.

2. The apparatus of claim 1 further including a housing conformed to contain said more than one carbon electrode and said separator and said electrolyte.

3. The apparatus of claim 1 further including a terminal connected with said more than one carbon electrode.

4. The apparatus of claim 1 wherein said apparatus is rolled and formed into a cylindrical shape.

5. The apparatus of claim 1 wherein said separator is a non-conductive porous separator.

6. An ultracapacitor apparatus comprising:
   a. a first carbon electrode with an outer surface and a porous inner surface with pores and a second carbon electrode with an outer surface and a porous inner surface with pores;
   b. a conductive metallic surface connected with said outer surface;
   c. a ceramic having a dielectric constant of 10,0000 or higher directly coating said pores of at least one of said porous inner surfaces;
   d. a non-conductive porous separator between said first carbon electrode and said second carbon electrode said separator not containing the ceramic coating; and
   e. an electrolyte.

7. The apparatus of claim 6 further including a housing conformed to contain said first carbon electrode and said second carbon electrode and said separator and said electrolyte.

8. The apparatus of claim 6 further including a terminal connected with said first carbon electrode and a terminal connected with said second carbon electrode.

9. The apparatus of claim 6 wherein said apparatus is rolled and formed into a cylindrical shape.

10. The apparatus of claim 6 wherein said carbon electrodes are made from material selected from a group of materials consisting of: activated carbon, carbon nano tubes, graphite, and charcoal.

11. The apparatus of claim 6 wherein said electrolyte is selected from a group of electrolytes consisting of: Propylene Carbonate or Acetonitrile in which an ionic salt dissolved therein, or an ionic liquid.

12. The apparatus of claim 6 wherein said high dielectric-constant ceramic is selected from a group of ceramics consisting of: Barium Titanate and Barium Strontium Titanate.

13. The apparatus of claim 6 wherein said conductive metallic surface is an aluminum sheet.

14. The apparatus of claim 6 wherein said non-conductive porous separator is high porosity paper.

15. A very high energy-density ultracapacitor method comprising:
   a. providing a first carbon electrode with an outer surface and a porous inner surface with pores and a second carbon electrode with an outer surface and a porous inner surface with pores, with a conductive metallic surface connected with said outer surfaces, with a ceramic having a dielectric constant of 10,000 or higher directly coating said pores of at least one of said porous inner surfaces, with a non-conductive porous separator located between said first carbon electrode and said second carbon electrode said separator not containing the ceramic coating, with an electrolyte comprising an ionic salt and with a terminal connected with said first carbon electrode and a terminal connected with said second carbon electrode; and b. connecting said terminals to an electrical system.

16. The method of claim 15 further including a housing conformed to contain said first carbon electrode and said second carbon electrode and said separator and said electrolyte.

17. The method of claim 15 wherein said capacitor is rolled and formed into a cylindrical shape.

18. The method of claim 15 wherein said ceramic is connected with said electrodes by means of a process selected from a group of processes consisting of: electrophoretic deposition, chemical vapor deposition and pulsed laser deposition.

19. The method of claim 16 wherein said housing is made of material selected from a group of materials consisting of: plastic and metal.

20. The apparatus of claim 11 wherein the ionic salt is tetraethylammonium-tetrafluoroborate or the ionic liquid is 1-butyl-3-methylimidazolium tetrafluoroborate.

21. The apparatus of claim 1 wherein said carbon electrodes are made from material selected from a group of materials consisting of: activated carbon, carbon nano tubes, graphite, and charcoal.

22. An ultracapacitor apparatus comprising:

a. more than one carbon electrode with an outer surface and a porous inner surface with pores;

b. a conductive metallic surface connected with said outer surface;

c. a high dielectric-constant ceramic directly coating the pores of said porous inner surface of at least one of said more than one carbon electrode wherein said high dielectric-constant ceramic is selected from a group of ceramics consisting of: Barium Titanate and Barium Strontium Titanate;

d. a separator between said more than one carbon electrode said separator not containing the ceramic coating; and e. an electrolyte comprising an ionic salt.

* * * * *

UNITED STATES PATENT AND TRADEMARK OFFICE
CERTIFICATE OF CORRECTION

PATENT NO.        : 9,312,076 B1
APPLICATION NO.   : 12/655426
DATED             : April 12, 2016
INVENTOR(S)       : Ezzat G. Bakhoum Page 1 of 1

It is certified that error appears in the above-identified patent and that said Letters Patent is hereby corrected as shown below:

In the specification

In Background of the Invention, Column 1, Line 55, "where $\in_o$ is the permittivity of free space, is the relative permittivity" should read --where $\in_o$ is the permittivity of free space, $\in_r$ is the relative permittivity--.

In the claims

In Claim 1C, Column 6, Line 1, "dielectric constant of 10,0000" should read --dielectric constant of 10,000--.

In Claim 4, Column 6, Line 13, "said apparatus is roiled and formed into a cylindrical shape" should read --said apparatus is rolled and formed into a cylindrical shape--.

In Claim 6B, Column 6, Line 23, "outer surface" should read --outer surfaces--.

In Claim 6C, Column 6, Line 24, "dielectric constant of 10,0000" should read --dielectric constant of 10,000--.

Signed and Sealed this
Twenty-eighth Day of June, 2016

Michelle K. Lee
*Director of the United States Patent and Trademark Office*